United States Patent [19]
Troemel et al.
[11] 3,830,985
[45] Aug. 20, 1974

[54] CALLING PARTY CONTROL CIRCUIT

[75] Inventors: Richard J. Troemel, North Prairie; Francis Y. Uechi, New Berlin, both of Wis.

[73] Assignee: GTE Automatic Electric Laboratories Incorporated, Northlake, Ill.

[22] Filed: Nov. 29, 1972

[21] Appl. No.: 310,313

[52] U.S. Cl. .............................. 179/81 R, 179/2 A
[51] Int. Cl. .............................. H04m 1/64
[58] Field of Search ........ 179/6 R, 81 R, 100.1 VC, 179/2 A, 2 DP, 81 R; 307/249, 252 B

[56] References Cited

UNITED STATES PATENTS

| | | | |
|---|---|---|---|
| 3,485,952 | 12/1969 | Walker | 179/6 R |
| 3,716,673 | 2/1973 | Meri | 179/6 R |
| 3,728,488 | 4/1973 | Bonsky | 179/6 R |
| 3,735,158 | 5/1973 | McDonald | 307/305 |

*Primary Examiner*—Kathleen H. Claffy
*Assistant Examiner*—Joseph A. Popek
*Attorney, Agent, or Firm*—David W. Heid

[57] ABSTRACT

Disclosed is a circuit for use in a telephone system for seizing a telephone line in response to incoming ringing signals and holding the line for either a predetermined period of time or until the calling party goes on-hook if that occurs prior to the expiration of the predetermined period of time. A bidirectional switching device is used in conjunction with a relay to hold the telephone line. Second and third relays and a timing arrangement cooperate to seize the line and drop it either after a predetermined period of time or upon the calling party going on-hook.

8 Claims, 1 Drawing Figure

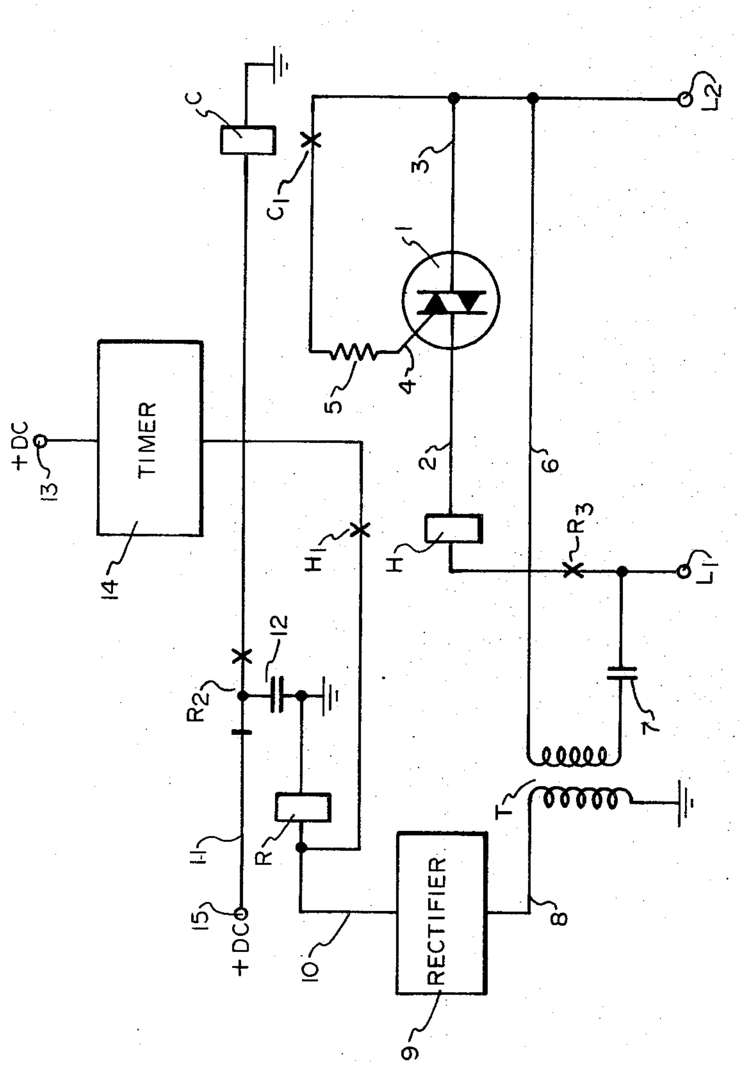
TIMER
RECTIFIER
+DC
+DC
13
14
15
11
12
R2
R
R3
H1
H
C
C1
1
2
3
4
5
6
7
8
9
10
T
L1
L2

CALLING PARTY CONTROL CIRCUIT

BACKGROUND OF THE INVENTION

This invention relates generally to telephone circuits and more particularly to a telephone circuit uniquely usable with telephone answering and recording devices.

Previous arrangements for holding a telephone line after it has been seized and held under control of the calling party have involved the use of syllabic modulation, i.e. sensing that the calling party is continuing to talk or that there is a tone being received on the line. In the syllabic modulation scheme, if no incoming message appeared for a set length of time then the line would be dropped. There are some disadvantages to using this modulation scheme however, since if the calling party went on-hook and dial tone was returned to the circuit then the full interval dedicated to, in the case of an answering recording machine, the incoming record portion would be used since dial tone would keep the machine in operation. One factor that allowed this to happen was that the control circuit was too slow to respond to the temporary interruption of line circuit or a battery reversal, whichever the case may be, which was received in response to the calling party going on-hook to drop the line.

SUMMARY OF THE INVENTION

The circuit of the present invention provides a unique arrangement for seizing the telephone line in response to incoming ringing signals and holding the line for either a predetermined length of time or until the calling party goes on hook whichever is shorter. In the instance where the calling party goes on-hook prior to the expiration of the predetermined period of time, the circuit responds to the cessation of line current or in the alternative battery reversal, received at the substation to release the telephone line.

In the instance wherein the calling party remains on the line for the full predetermined period of time, even though he may stay off-hook and thus supply line current to the calling party control circuit a timing arrangement will cause the line to be dropped rather than allowing the calling party to continue holding the line and preventing other users from gaining access thereto.

One of the objects of the present invention is to provide a calling party control circuit which responds to the line current reaching a predetermined minimum, or in the alternative battery reversal to the substation, when the calling party goes on-hook to release the line.

A second object is to provide a calling party control circuit which is insensitive to the polarity of the line voltage which is connected to the terminals of the control circuit.

Another object of the present invention is to provide a calling party control circuit which will release a previously held line after a predetermined period of time even though the calling party remains off-hook.

BRIEF DESCRIPTION OF THE DRAWING

The present invention is disclosed with the aid of a single DRAWING which is partly block and partly schematic.

DESCRIPTION OF THE PREFFERED EMBODIMENTS

Now referring to the single drawing FIGURE, the telephone line conductors (not shown) coming from the central office are connected to terminals $L_1$ and $L_2$ of the circuit. A D.C. path for loading the line is provided by, tracing the circuit from terminal $L_1$, $L_1$ through make contacts $R_3$ through relay H, through bidirectional switch 1 and back to terminal $L_2$. When the circuit is in the idle condition, that is the line conductors from the central office are connected to terminals $L_1$ and $L_2$ and line voltage appears thereacross, but no ringing potential is being applied, relays R, C and H are unoperated.

It will of course be appreciated that with relay R unoperated no D.C. current path is available for permitting current flow through relay H and bidirectional switching device 1. Bidirectional switching device 1 may take the form of what is commonly called a Triac, having a pair of anodes designated 2 and 3, and a gate designated 4. The Triac exhibits the characteristic that it will conduct when a potential is placed thereacross such that anode 2 is positive with respect to anode 3, or vice versa, if control electrode 4 receives a gating pulse during the time that a potential is applied to the anodes. By using a bidirectional switch of this characteristic, the calling party control circuit will operate regardless of the polarity of the telephone line which is connected to terminals $L_1$ and $L_2$. In the present circuit it will be noted that gate 4 is connected to terminal $L_2$ via the path which includes current limiting resistor 5 and make contacts $C_1$. Thus it will be appreciated that when the circuit is at rest, bidirectional switching device 1 will not conduct since no potential is applied to its gate since relay C is unoperated.

Initiation of line seizing is begun upon receipt of a ringing signal. A ringing signal appearing across terminals $L_1$ and $L_2$ is coupled via conductor 6 to the primary winding of transformer T, through capacitor 7 and back to terminal $L_1$. The ringing signal induced into the secondary winding of transformer T appears from ground to the upper conductor 8 and is rectified by rectifier 9. The recitified voltage appearing at conductor 10 is coupled to relay R back to ground causing relay R to operate. At this point it should be noted that a positive D.C. potential 15 is applied to conductor 11 and is coupled through break contact $R_2$ to capacitor 12 charging capacitor 12. Upon the operation of relay R, make contact $R_2$ will close and the positive potential appearing on capacitor 12 will be discharged through relay C thereby operating relay C. Upon the operation of relay C, make contacts $C_1$ will close and the potential appearing at terminal $L_2$ will be gated to gate 4 of bidirectional switching device 1 via current limiting resistor 5. Bidirectional switch 1 is now gated for conduction and line current will begin to flow from terminal $L_2$ (assuming $L_2$ is positive with respect to $L_1$) through bidirectional switch 1, through relay H and through make contacts $R_3$ which are now closed since relay R has been operated by rectified ringing voltage.

As is true in the conventional telephone system, once line current begins to flow the ringing generator at the central office will be tripped and the ringing signal will cease to appear across the line conductors. Thus with the cessation of the ringing signal due to the flow of line current the ringing interval is complete, the ringing interval being that period of time during which the ringing equipment is connected to the subscriber line for transmitting ringing signals to the telephone station. Relay R will remain energized after ring trip however by the positive potential applied thereto from source 13, through timer 14, through make contacts $H_1$ which are now closed since relay H is being energized by the flow of line current. Timer 14 will take the form of either an electronic or mechanical switch arrangement which may be set to complete the path from the positive D.C. source 13 through the timer and retain relay R operated for a predetermined time interval as long as relay H is also energized.

If the present circuit is used in conjunction with a recording and reproducing device, then timer 14 would be set to complete the D.C. circuit from source 13 to make contacts $H_2$ for the length of time equal to that set aside for the outgoing message plus the time allotted for recording any incoming message. This allows the circuit to limit the total time used by each caller to some maximum time. In the event that a calling party seizes the line, and fails to go on-hook after leaving his message, then even though line current will continue to flow through bidirectional switching device 1 and relay H the line circuit will be dropped after timer 14 opens the holding path to relay R. When relay R releases, make contacts $R_3$ will of course open and the path for line current from terminal $L_2$ around through bidirectional switching device 1 and relay H will be broken and the line hence released.

Another possibility which may occur after the line has been seized is that the calling party will go on-hook prior to having used the total time allotted by timer 14. In the situation in which the line voltage to the substation goes to zero when the calling party goes on-hook, when the line current flowing through bidirectional switch 1 decreases to its minimum holding value bidirectional switch 1 will cease to conduct and consequently relay H will become de-energized. Upon relay H becoming de-energized, make contacts $H_1$ will of course open and the relay R will no longer receive operating potential from D.C. source 13 and hence relay R will release. Even though the line voltage will again be reapplied to terminals $L_1$ and $L_2$ by the central office, the circuit will not seize the line until ringing potential is again supplied. This will be appreciated since $R_3$ make contacts will be open since relay R is de-energized and secondly after the discharge time of capacitor 12 has expired then relay C of course will be unoperated so that a reappearance of line voltage very shortly after its cessation will not again seize the line. Now that the line has been released and relays R, C and H are again all de-energized, then capacitor 12 will again be charged by positive D.C. source 15 via conductor 11 and break contacts $R_2$ so that upon reoperation of relay R by an incoming ringing signal capacitor 12 will discharge through relay C and trigger bidirectional switching device 1 again into conduction to seize the line.

If this calling party control circuit is utilized with a central office switch which returns reverse battery upon the calling party going on-hook, then the battery reversal to terminals $L_1$ and $L_2$ will drop the current flowing through bidirectional switching device 1 and relay H to zero, and when the current through bidirectional switching device 1 reaches its minimum holding value bidirectional switch 1 will stop conducting. Once conduction has ceased the line will not again be seized upon return of normal battery polarity to terminals $L_1$, $L_2$ since make contacts $C_1$ will be open as will make contacts $R_3$ since relay R will have been released via make contacts $H_1$.

Thus it can be seen that the calling party control circuit of the present invention limits the total amount of time which the line is seized to a predetermined maximum as well as providing almost immediate release of the line if the calling party goes on-hook prior to the expiration of this predetermined period of time. Thus if the calling party control circuit described herein is used with a recording and reproducing device, the amount of recording time which may be utilized for incoming messages may be greatly increased since the incoming recording will only be accomplished during the time that the calling party is on the line and the unnecessary usage of recording time will be avoided since the machine will not have to cycle through a fixed amount of incoming recording time for each cycle of operation even though the calling party has gone on-hook.

What is claimed is:

1. A circuit for seizing a telephone line, having a plurality of line conductors, in response to the receipt of incoming ringing signals, said circuit comprising:

a bidirectional switch having first, second and third terminals;

means for connecting said first and second terminals of said switch across said telephone line;

a first relay for connecting said third terminal of said switch to one of the line conductors; and means responsive to the receipt of incoming ringing signals for supplying an operating potential to said first relay whereupon said first relay is operated, and said third terminal is connected to one of the line conductors whereby current is allowed to flow through said bidirectional switch to seize said line and cause the cessation of the transmission of ringing signals to said line.

2. The circuit as claimed in claim 1 wherein said means responsive to the receipt of incoming ringing signals for supplying an operating potential to said first relay includes circuit means for limiting the application of said operating potential to said first relay to a time slightly beyond the ringing interval.

3. The circuit as claimed in claim 1 wherein said means responsive to the receipt of incoming ringing signals for supplying an operating potential to said first relay includes a second relay which is operated in response to the receipt of ringing signals to connect said operating potential to said first relay.

4. The circuit as claimed in claim 3 wherein said means for connecting said first and second terminals of said switch across said telephone line includes a third relay.

5. The circuit as claimed in claim 1 wherein said bidirectional switch is a triode-thyristor.

6. The circuit as claimed in claim 3 including capacitor means for storing an electrical charge and means, including said second relay, for connecting said capacitor means to said first relay upon the receipt of ringing signals whereby said capacitor means discharges through and operates said first relay.

7. A circuit for seizing a telephone line, having a plurality of line conductors, in response to the receipt of incoming ringing signals and releasing said line either in response to the calling party going on-hook or after said line has been seized for a predetermined period of time, said circuit comprising:

hold means, including a bidirectional switch and a holding relay connected in series, connectible across said telephone line for seizing and holding said line, said bidirectional switch including a control electrode;

enabling means connectible to said telephone line, said enabling means including a ring relay operable in response to the receipt of ringing signals;

triggering means, responsive to the operation of said ring relay, for connecting said control electrode to one of the telephone line conductors whereby said bidirectional switch is allowed to conduct and seize said telephone line; and timing means, connectible to said ring relay in response to the operation of said holding relay, for sustaining operation of said ring relay and said hold means for a predetermined period of time after seizure of said line, said bidirectional switch being responsive to the current therethrough dropping to some predetermined value whereby said switch ceases to conduct and the hole relay is released, thereby disabling said timing means and releasing said line.

8. The circuit as claimed in claim 7 wherein, said triggering means includes capacitor means for storing a charge and a trigger relay connected thereto, whereby upon operation of said ring relay said capacitor discharge through and operates said trigger relay, thereby connecting said control electrode to one of said line conductors.

* * * * *